United States Patent
Agrawal et al.

(10) Patent No.: US 12,021,906 B2
(45) Date of Patent: Jun. 25, 2024

(54) ELECTRONIC DEVICE WITH AUTOMATIC SELECTION OF IMAGE CAPTURING DEVICES FOR VIDEO COMMUNICATION

(71) Applicant: MOTOROLA MOBILITY LLC, Wilmington, DE (US)

(72) Inventors: Amit Kumar Agrawal, Bangalore (IN); Bill Ryan, Libertyville, IL (US); Daniel M Vacura, Chicago, IL (US); Jeffrey S Vanhoof, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 61 days.

(21) Appl. No.: 17/682,504

(22) Filed: Feb. 28, 2022

(65) Prior Publication Data

US 2023/0275940 A1 Aug. 31, 2023

(51) Int. Cl.
*H04L 65/1089* (2022.01)
*H04N 23/611* (2023.01)
*H04W 4/20* (2018.01)

(52) U.S. Cl.
CPC ....... *H04L 65/1089* (2013.01); *H04N 23/611* (2023.01); *H04W 4/20* (2013.01)

(58) Field of Classification Search
CPC ..... H04L 65/1089; H04N 23/611; H04W 4/20
See application file for complete search history.

(56) References Cited

U.S. PATENT DOCUMENTS

| | | | |
|---|---|---|---|
| 9,491,374 B1* | 11/2016 | Avrahami | G06V 40/20 |
| 2016/0286166 A1* | 9/2016 | Sandvik | H04N 7/15 |
| 2017/0289647 A1* | 10/2017 | Lee | H04N 7/142 |
| 2022/0244836 A1* | 8/2022 | O'Leary | G06F 3/04845 |
| 2023/0036861 A1* | 2/2023 | Lum | G06V 40/193 |

* cited by examiner

*Primary Examiner* — Phung-Hoang J Nguyen
(74) *Attorney, Agent, or Firm* — Isidore PLLC (57) ABSTRACT

An electronic device incorporates, and a method and a computer program product provide automatic selection of an image capturing device during video communication session to encompass a local participant. A network interface(s) of the electronic device communicatively connects over a network second electronic device(s). A controller of the electronic device monitors a first image capturing device having a first field of view (FOV) and that produces first image content and a second image capturing device having a second FOV that differs from the first FOV and that produces second image content. In response to a trigger event to start providing image content to the video communication session, the controller determines which one of the first FOV and the second FOV encompasses the local participant in the video communication session and communicates a corresponding one of the first image content and the second image content to the video communication session.

20 Claims, 8 Drawing Sheets

ELECTRONIC DEVICE WITH AUTOMATIC SELECTION OF IMAGE CAPTURING DEVICES FOR VIDEO COMMUNICATION

BACKGROUND

1. Technical Field

The present disclosure relates generally to electronic devices that support and/or enable video communication sessions with second communication device(s), and more particularly to electronic devices that have more than one camera that can support video communication sessions.

2. Description of the Related Art

Electronic devices such as mobile handheld smartphones or tablets are increasingly used for a number of image capturing applications by incorporating different types of cameras in addition to a default camera. Examples include telephoto cameras, wide angle cameras, and macro cameras on front and back sides. The camera options generally surpass image capturing devices presented on laptops or monitors. Conversely, mobile handheld smartphones and tablets have a small display as compared to the laptops and monitors. Recent technological advances enable cooperative use of one device that has a large display with another device that has a small display but a high performance camera. Although combining the capabilities can provide an effective video communication session, setup of the session is inconvenient. The position of the small device can vary, especially since the display of the small device may not be oriented toward the user. The default camera may not be the best camera to use during the session. The local participant often has to fumble with the camera controls at the beginning of the video communication session, degrading the impression given to other participants as well as being personally inconvenienced.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to a first aspect of the present disclosure, an electronic device incorporates a method and a computer program product that provide automatic selection of an image capturing device to encompass a local participant during a video communication session. The electronic device has at least two image capturing devices including: (i) a first image capturing device having a first field of view (FOV) and that produces first image content; and (ii) a second image capturing device having a second FOV that differs from the first FOV and that produces second image content. The electronic device includes at least one network interface that communicatively connects the electronic device over a network to one or more second electronic devices during a video communication session. A controller of the electronic device is communicatively coupled to the first image capturing device, the second image capturing device, and the at least one network interface. In response to detecting a trigger event to start providing image content to a video communication session, the controller determines which one of the first FOV and the second FOV encompasses a local participant in the video communication session. The controller communicates a corresponding one of the first image content and the second image content to the video communication session.

In one or more embodiments, the controller determines that the electronic device is docked or kept in a stationary position and is in a ready context to be used for a video communication session. The trigger event occurs when the video communication session is initiated by the electronic device, or a call for a video communication is received from a second electronic device. The controller utilizes the camera sensors of at least two image capturing devices, including a front and a back camera, to capture image content, such as video feeds, from the at least two image capturing devices. The controller determines which of the front camera and the back camera is an optimal camera to be used to encompass a local participant. The determination may be based on scene detection for a potential local participant as a subject of the video communication session. The determination may be based on sound detection of speech by the potential local participant. The determination may be made by determining which of more than one camera (e.g., wide angle, macro, normal, telephoto) on the same side of the electronic device that are viewing the local participant provides the best view. The automatic selection of camera may reoccur during the video communication session in response to the local participant moving out of the FOV of a currently selected camera.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
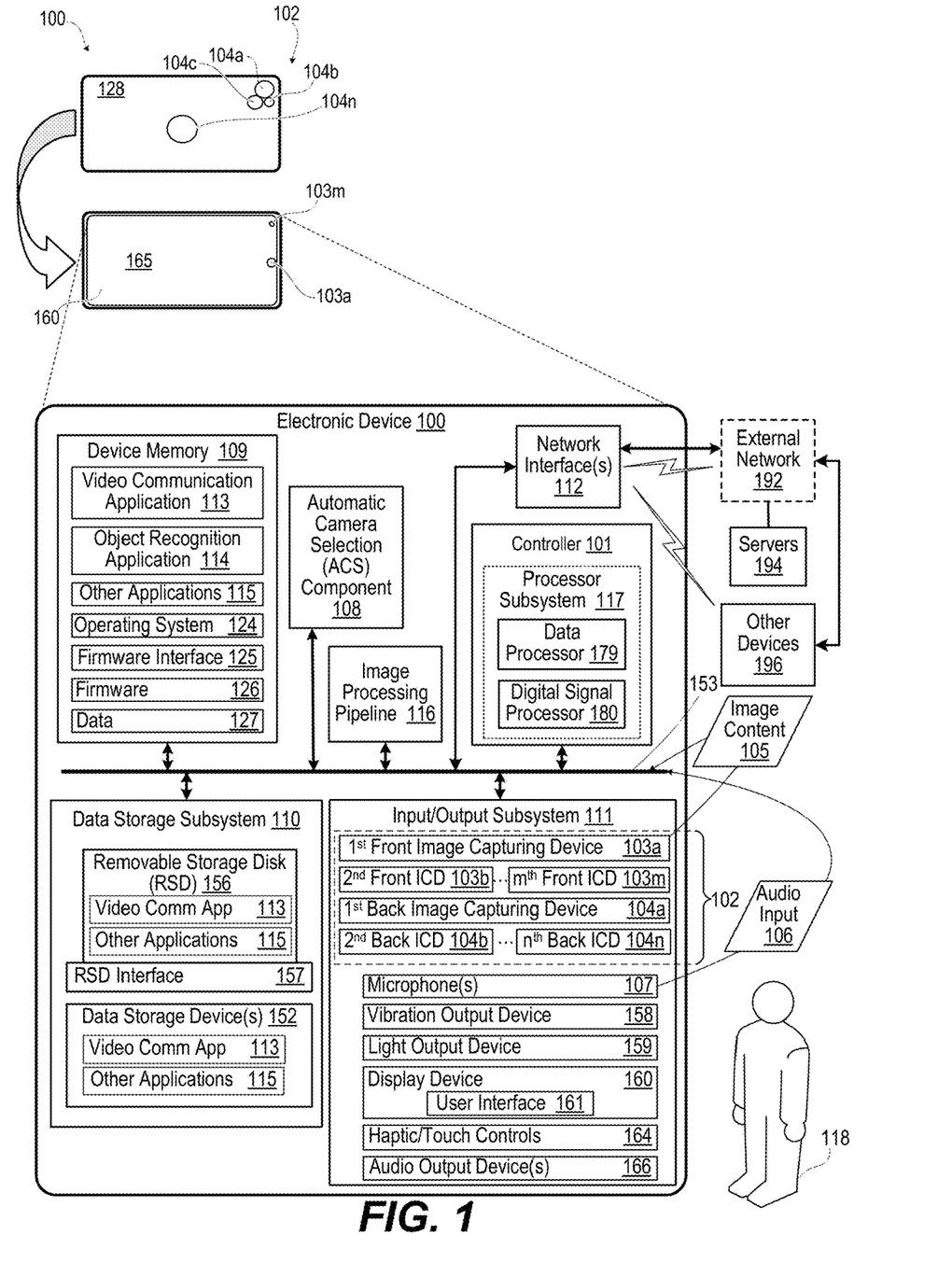
FIG. 1 is a functional block diagram of an electronic device that automatically selects one of multiple image capturing devices during a video communication session, according to one or more embodiments.

FIG. 1 is a functional block diagram of electronic device 100 in an operating environment within which the features of the present disclosure are advantageously implemented. In particular, controller 101 of electronic device 100 is communicatively coupled to two or more image capturing devices 102, such as front image capturing devices 103a-103m and back image capturing devices 104a-104n that may be used during a video communication session. In an example, front image capturing device 103a is an optical camera and front image capturing device 103m is an infrared or low light camera. Back image capturing device 104a is a telephoto camera. Back image capturing device 104b is a wide angle camera or panoramic camera. Back image capturing device 104c is a macro camera. Back image capturing device 104n is a high-speed camera. Controller 101 receives image content 105 of images or video from image capturing devices 102. Controller 101 may also receive audio input 106 from microphone(s) 107. Controller 101 includes automatic camera selection (ACS) component 108 that uses one or both of image content 105 and audio input 106 to automatically select one image capturing device 102 as the camera in service for a video communication session or call. The user may optionally select another image capturing device 102 but does not have to. Electronic device 100 can be one of a host of different types of devices, including but not limited to, a mobile cellular phone, satellite phone, or smart-phone, a laptop, a net-book, an ultra-book, a networked smart watch, networked sports/exercise watch, and/or a tablet computing device or similar device.

Figure 2:
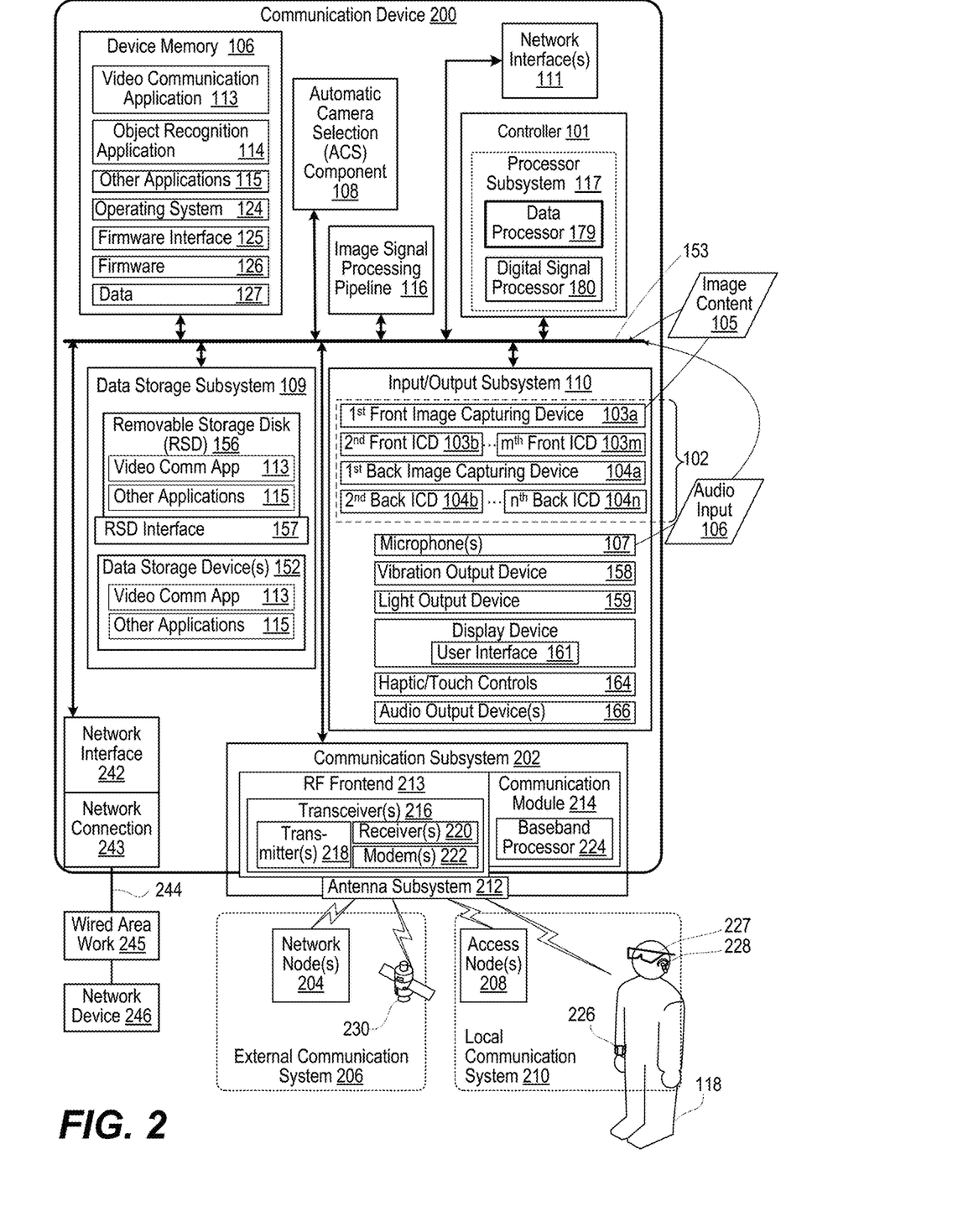
FIG. 2 is a functional block diagram of a communication device in an operating environment within which the features of the present disclosure are advantageously implemented, according to one or more embodiments.

As more completed presented within communication device 200 of FIG. 2, described hereafter, electronic device 100 can also be a device supporting wireless communication. In these implementations, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Most importantly, it is appreciated that the features described herein can be implemented with a display device of various other types of electronic devices that are not necessarily a communication device. The specific presentation or description herein of a mobile communication device in addition to a data processing system as different examples of electronic device 100 are for example only, and not intended to be limiting on the disclosure.

Referring now to the specific component makeup and the associated functionality of the presented components. In one or more embodiments, electronic device 100 includes device memory 109, data storage subsystem 110, input/output (I/O) subsystem 111, and network interface 112, each of which is managed by controller 101. Device memory 109 includes program code for applications, such as video communication application 113, object recognition application 114, and other application(s) 115. ACS component 108 may be program code in device memory 109. Alternatively, ACS component 108 may be a dedicated digital signal processing module or feature of image processing pipeline 116. Image processing pipeline 116 performs additional image processing algorithms or adjustments. Device memory 109 further includes operating system (OS) 124, firmware interface 125, such as basic input/output system (BIOS) or Uniform Extensible Firmware Interface (UEFI), and firmware 126. Device memory 109 stores data 127 that is used by ACS component 108, video communication application 113, object recognition application 114, and other application(s) 115.

Controller 101 includes processor subsystem 117, which executes program code to provide operating functionality of electronic device 100. The software and/or firmware modules have varying functionality when their corresponding program code is executed by processor subsystem 117 or secondary processing devices within electronic device 100. Processor subsystem 117 of controller 101 can execute program code of ACS component 108, video communication application 113, object recognition application 114, and other application(s) 115 to configure electronic device 100 to perform specific functions. These functions can include determining which front image capturing devices 103a-103m and back image capturing devices 104a-104n on back cover 128 has a best view of person 118 that is a local participant in a video communication session. Device memory 109 can include data 127.

Data storage subsystem 110 of electronic device 100 includes data storage device(s) 152. Controller 101 is communicatively connected, via system interlink 153, to data storage device(s) 152. Data storage subsystem 110 provides applications, program code, and stored data on nonvolatile storage that is accessible by controller 101. For example, data storage subsystem 110 can provide a selection of applications and computer data, such as ACS component 108 and other application(s) 113. These applications can be loaded into device memory 109 for execution by controller 101. In one or more embodiments, data storage device(s) 152 can include hard disk drives (HDDs), optical disk drives, and/or solid-state drives (SSDs), etc. Data storage subsystem 110 of electronic device 100 can include removable storage device(s) (RSD(s)) 156, which is received in RSD interface 157. Controller 101 is communicatively connected to RSD 156, via system interlink 153 and RSD interface 157. In one or more embodiments, RSD 156 is a non-transitory computer program product or computer readable storage device. Controller 101 can access RSD 156 or data storage device(s) 152 to provision electronic device 100 with program code, such as code for ACS component 108 and other application(s) 113.

I/O subsystem 110 includes user interface components such as image capturing device 102, vibration output device 158, light output device 159, display device 160, microphone 107, touch/haptic controls 164, and audio output device(s) 166. Display device 160 is communicatively coupled to controller 101 and presents user interface 161 on front display screen 165 and/or operates as a user interface device.

Controller 101 manages, and in some instances directly controls, the various functions and/or operations of electronic device 100. These functions and/or operations include, but are not limited to including, application data processing, communication with second communication devices, navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic.

Processor subsystem 117 includes one or more central processing units (CPUs), depicted as data processor 179. Processor subsystem 117 can include one or more digital signal processors 180 that are integrated with data processor 179. Processor subsystem 117 can include other processors that are communicatively coupled internally or externally to data processor 179. Data processor 179 is communicatively coupled, via system interlink 153, to device memory 109, data storage subsystem 110, and network interface 112. Network interface 112 enables electronic device 100 to connect (via wireless or wired connection) to external network 192 and directly/indirectly to other devices 196 such as a display monitor, television, or laptop computer. Network 192 can include one or more network servers 194 and can provide connection to one or more network servers 194 and other devices 196. Electronic device 100 is thus able to connect with servers 194 and other devices 196 to share and/or download application data that can be utilized to implement features of the disclosure.

System interlink 153 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 153) are illustrated in FIG. 1, it is to be understood that more, fewer, or different interconnections may be present in other embodiments.

FIG. 2 is a functional block diagram of communication device 200 in an operating environment within which the features of the present disclosure are advantageously implemented. Communication device 200 is an implementation of electronic device 100 (FIG. 1) that further includes communication subsystem 202 for communicating using a cellular connection with network node(s) 204 of external communication system 206 and for communicating using a wireless connection with access node(s) 208 of local communication system 210. Communication subsystem 202 includes antenna subsystem 212. Communication subsystem 202 also includes radio frequency (RF) front end 213 and communication module 214. RF front end 213 includes transceiver(s) 216, which includes transmitter(s) 218 and receiver(s) 220. RF front end 213 further includes modem(s) 222. Communication module 214 of communication subsystem 202 includes baseband processor 224 that communicates with controller 101 and RF front end 213. Baseband processor 224 operates in a baseband frequency range to encode data for transmission and decode received data, according to a communication protocol. Modem(s) 222 modulate baseband encoded data from communication module 214 onto a carrier signal to provide a transmit signal that is amplified by transmitter(s) 218. Modem(s) 222 demodulates each signal received via antenna subsystem 212 from external communication subsystem 202. The received signal is amplified and filtered by receiver(s) 220, which demodulate received encoded data from a received carrier signal.

In one or more embodiments, controller 101, using communication subsystem 202, performs multiple types of cellular OTA or wireless communication with local communication system 210. Communication subsystem 202 can communicate via Bluetooth connection with one or more personal access network (PAN) devices, such as smart watch 226, smart glasses 227, and wireless headset 228. Communication via Bluetooth connection includes both transmission and reception via a Bluetooth transceiver device. In one or more embodiments, communication subsystem 202 communicates with one or more locally networked devices via a wireless local area network (WLAN) link provided by access node(s) 208. In one or more embodiments, access node(s) 208 supports communication using one or more IEEE 802.11 WLAN protocols. Access node(s) 208 is connected to a wide area network such as the Internet. In one or more embodiments, communication subsystem 202 communicates with GPS satellites 230 to obtain geospatial location information.

In one or more embodiments, communication device 200 includes network interface controller (NIC or "network interface") 242 with a network connection (NC) 243. NIC 242 can be synonymous with and perform similar functions as network interface 112 (FIG. 1) in some implementations. Network cable 244 connects NC 243 to wired area network 245. For example, NC 243 can be an Ethernet connection. NIC 242 can support one or more network communication protocols. Wired area network 245 can be a local area network (LAN), a campus area network (CAN), a metropolitan area network (MAN), or a wide area network (WAN). Network device 246 is communicatively coupled to wired area network 245.

Figure 3A:
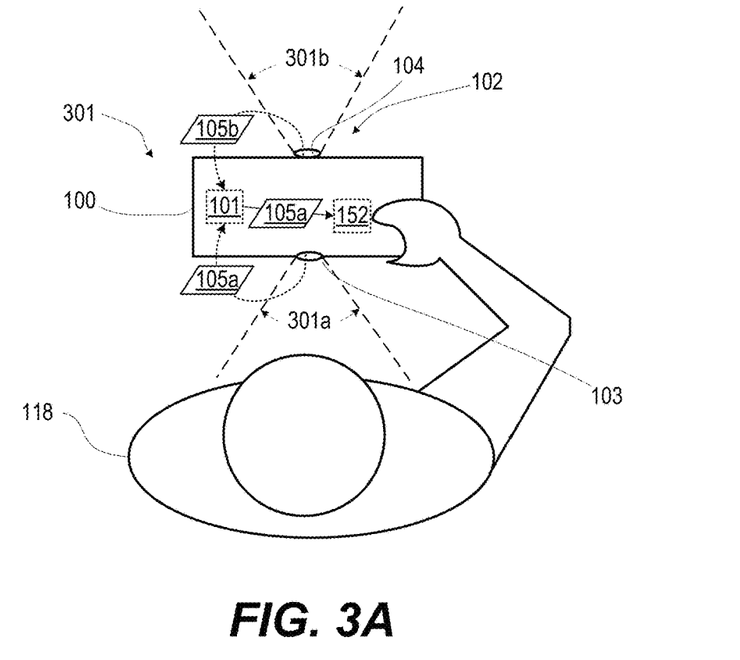
FIG. 3A is a diagram of the electronic device of FIG. 1 automatically selecting one of multiple image capturing devices for recording during a video recording session, according to one or more embodiments.

FIG. 3A is a diagram of electronic device 100 of FIG. 1 automatically selecting one of multiple image capturing devices 102 for recording person 118 during video recording session 301. For clarity, image capturing devices 102 include front image capturing device 103 and back image capturing device 104. Controller 101 of electronic device 100 determines that person 118 is within front FOV 301a, i.e., is incorporated within first image content 105a of front image capturing device 103. Controller 101 of image capturing device 100 also determines that person 118 is not within back FOV 301b, i.e., is not incorporated within second image content 105b of back image capturing device 104. Controller 101 thus selects and activates front image capturing device 103 as the active camera. Electronic device 100 records first image content 105a in data storage device 152.

Figure 3B:
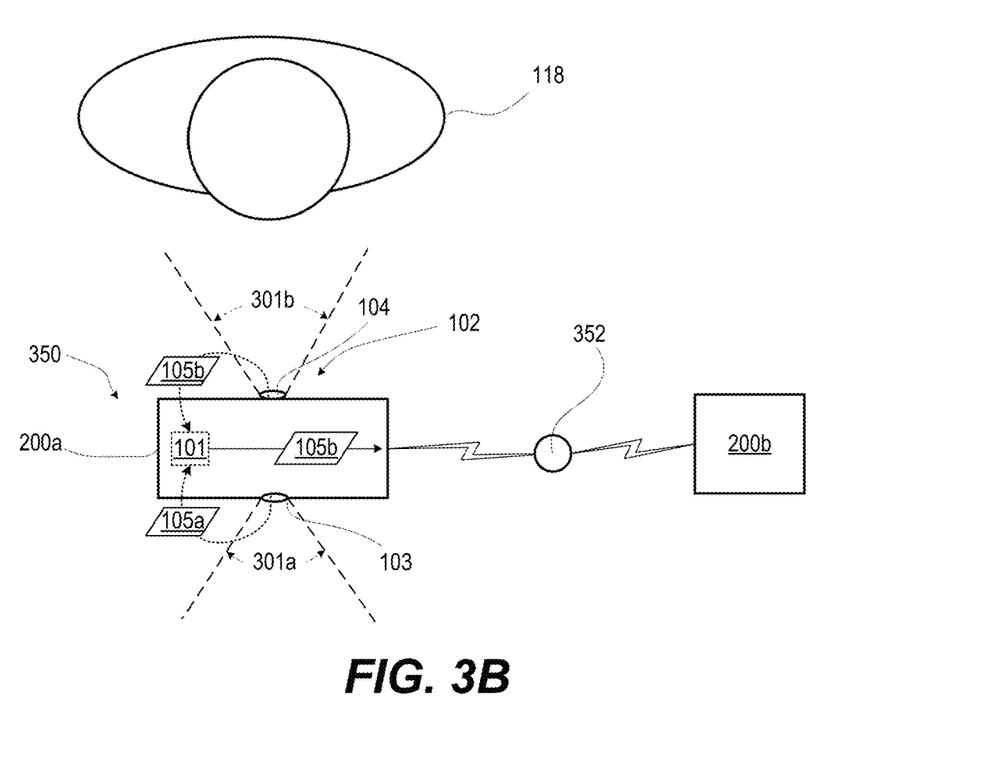
FIG. 3B is a diagram of the communication device of FIG. 2 automatically selecting one of multiple image capturing devices for transmitting to a video communication session with at least one second communication device, according to one or more embodiments.

FIG. 3B is a diagram of first communication device 200a (FIG. 2) automatically selecting one of multiple image capturing devices 102 for transmitting captured image/video content to video communication session 350. Controller 101 of first communication device 200a determines that person 118 is not within front FOV 301a, i.e., is not incorporated within first image content 105a of front image capturing device 103. Controller 101 of also determines that person 118 is within back FOV 301b, i.e., is incorporated within second image content 105b of back image capturing device 104. Controller 101 thus selects and activates back image capturing device 103 as the active camera. First communication device 200a transmits second image content 105b to at least one second communication device 200b via network 352. Network 352 may include one or more communication links that utilize a peer-to-peer network, a personal access network (PAN), a wired local access network (LAN), an ad hoc network, a wireless local access network (WLAN), a wireless wide area network (WWAN)

Figure 4:
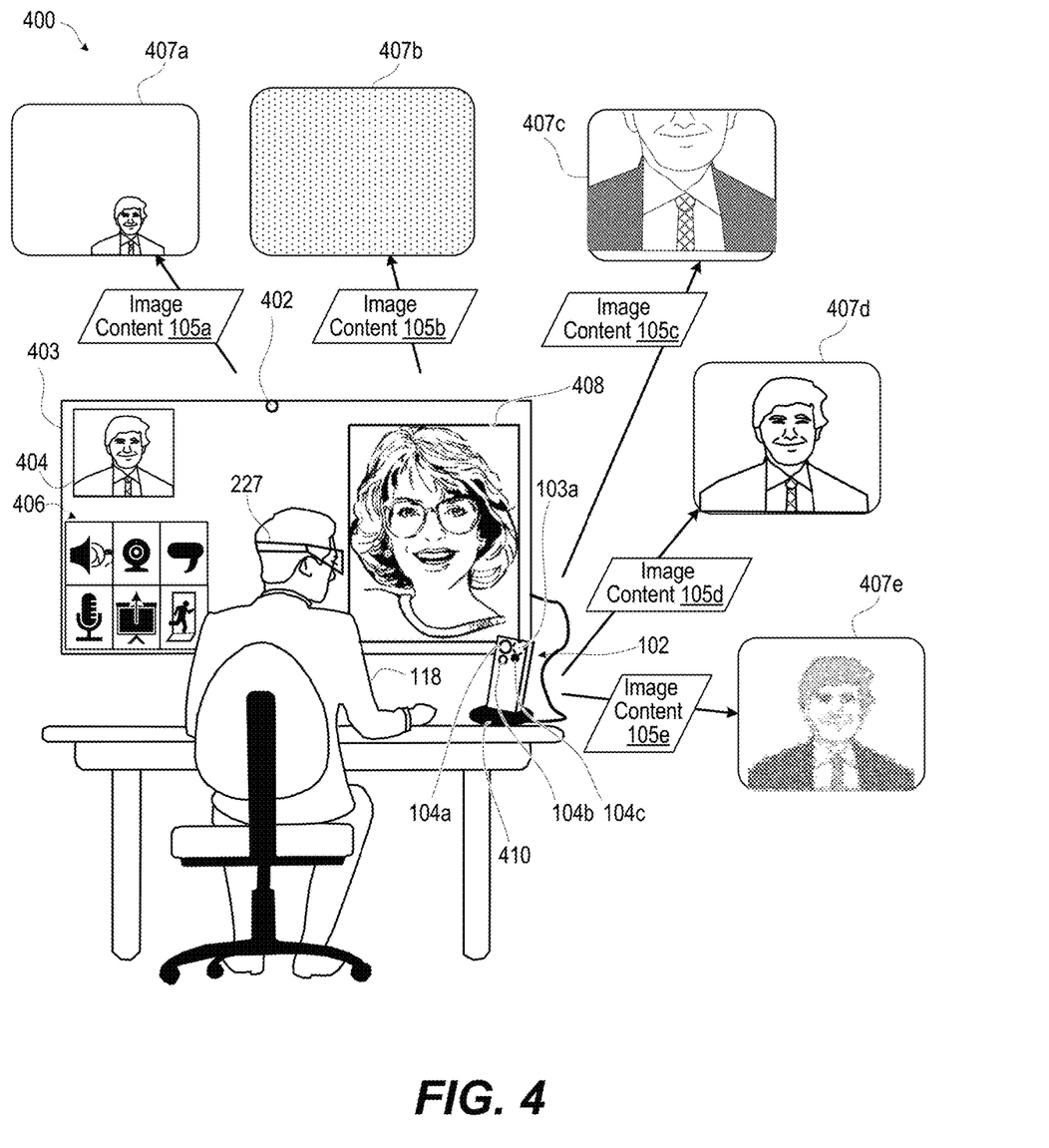
FIG. 4 is a side view a communication environment including a display monitor communicatively connected to the electronic device of FIG. 1, which has multiple image capturing devices that can be automatically selected to provide optimized image content to a video communication session, according to one or more embodiments.

FIG. 4 is a side view of communication environment 400 with external display monitor 403 communicatively coupled to electronic device 100, which has, or is communicatively coupled to, multiple image capturing devices 102 including at least one front and one rear image capturing device. In one or more embodiments, a virtual display monitor is presented to person 118 who is wearing smart glasses 227. Electronic device 100 automatically selects one image capturing device from among the multiple image capturing devices 102 to provide optimized image content of person 118 to video communication session 350 (FIG. 3B). In an example, electronic device 100 communicates via network interface(s) 112 to other devices 196 (FIG. 1). In another example, electronic device 100 includes the additional communication components and functionality of communication device 200 (FIG. 2) to communicate with one or more second communication devices 200b (FIG. 3B). Electronic device 100 presents user interface 161 on external display monitor 403. User interface 161 includes local image content 404, video communication controls 406, and remote image content 408. In one or more embodiments, electronic device 100 detects a trigger event to automatically select one of multiple image capturing devices 102. As an example, electronic device 100 may detect a call from a network device or second communication device to accept a video communication session or call. In another example, electronic device 100 may detect that person 118 has entered a user input to initiate a video communication call or to join a video communication session. In an additional example, electronic device 100 may detect a change in what objects are encompassed within the FOVs of the available image capturing devices 102, prompting a new selection of one of image capturing devices 102 that presents a best view of person 118. The triggering event may include or wholly comprise detecting that electronic device 100 is situated in a stationary position, such as placed in dock 410, with a communication connection that is ready for a video communication session.

Electronic device 100 selects a single one of image capturing devices 102 having the best or optimal view of person 118, who is the local participant in the video communication session. Several different criteria, each given a relative priority/weight of importance compared to the others, can be utilized to determine which image capturing device has the optimal view of person 118. A first criterion may be that person 118 is visible within the FOV. A second criterion, which has a higher priority/weight and is thus preferred over the first criterion, may be that a head of person 118 is visible. A third criterion, which has a higher priority/weight and is thus preferred over the second criterion, may be that a face of person 118 is visible. Alternatively, or in addition, a fourth criterion may be that an in-focus view of person 118 is preferred over an out-of-focus view of person 118. Alternatively, or in addition, a fifth criterion may be that a larger view of person 118 is preferred over a smaller view of person 118. Alternatively, or in addition, a sixth criterion may be that a centered view of person 118 is preferred over an off-centered view of person 118.

As an example, electronic device 100 has access to image content 105a, 105b, 105c, 105d, and 105e respectively from respective image capturing devices 102 including: external image capturing device 402 on external display monitor 403; front image capturing device 103a; and rear image capturing devices 104a, 104b and 104c of electronic device 100. Controller 101 (FIG. 1) may select one of image capturing devices 102 that satisfies the one or more criteria or that meets the one or more criteria to a greater degree than other image capturing devices 102. In an example, if the only views available are view 407a and view 407b, view 407a is evaluated by controller 101 to be "better" than view 407b because person 118 is visible in view 407a and not viewable in view 407b. With the larger example, view 407c may be generally unacceptable because the full head of person 118 is not encompassed. View 407*d* is evaluated by controller 101 to be "best" (or "optimal") because both the head and torso of person 118 is encompassed and in focus. By contrast, view 407*e* is less acceptable than view 407*d*, because view 407*e* is out of focus. Other views may be available, such as a low light view that may be best in a low light condition only when other image capturing devices 102 are unable to clearly capture person 118.

Figure 5:
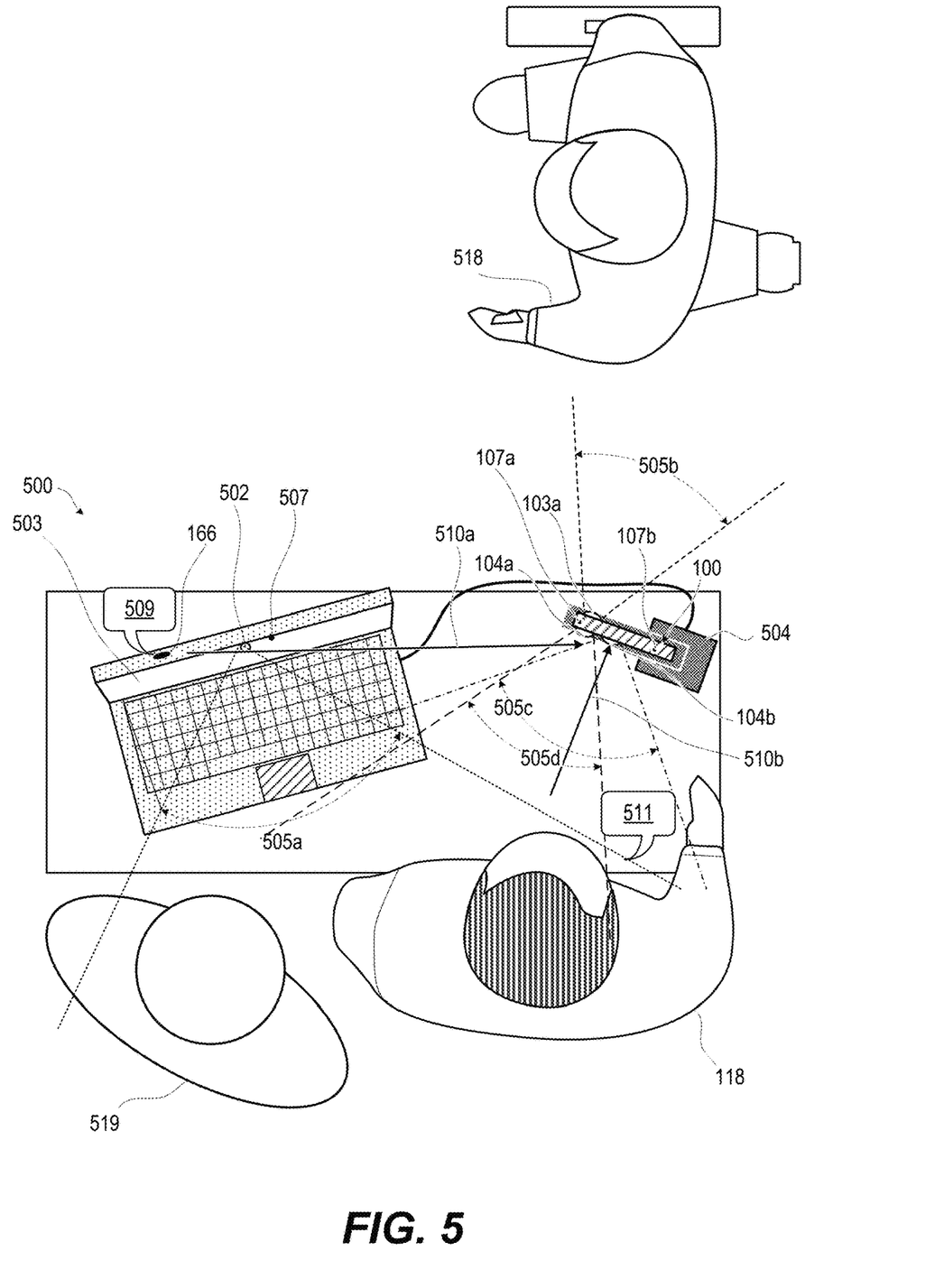
FIG. 5 is a top view of a communication environment including a laptop and the electronic device of FIG. 1, which has multiple image capturing devices that can be automatically selected based on audio direction sensing, according to one or more embodiments.

FIG. 5 is a bird's eye view of communication environment 500 having electronic device 100 placed in a dock and communicatively tethered to laptop 503, with both devices having and/or communicatively coupled to multiple image capturing devices 102. Electronic device 100 uses audio direction sensing by microphone(s) 107 to identify person 118 who is the local participant to a video communication session that is being initiated or is ongoing. Electronic device 100 automatically selects one of multiple image capturing devices 102 to provide to the video communication session an optimized image content that includes person 118. In one embodiment, electronic device 100 is represented by communication device 200 of FIG. 2 that is positioned in dock 504. In the provided example, image capturing devices 102 include external image capturing device 502 on laptop 503, front image capturing device 103*a* of electronic device 100, and rear image capturing devices 104*a*-104*b* of electronic device 100. FOV 505*a* of external image capturing device 502 encompasses person 118. FOV 505*b* of front image capturing device 103*a* is directed away from person 118 but encompasses second person 518 who is not a participant in the video communication session. Respective ones of FOVs 505*c*-505*d* of image capturing devices 104*a*-104*b* include different views that encompass at least a face of person 118. Third person 519 who is not speaking is also within FOVs 505*a*, 505*c*, and 505*d*. In an example, microphone(s) 107 include affiliated microphone 507 of laptop 503 and first and second microphones 107*a*-107*b* of electronic device 100. In an example, electronic device 100, which may be replaced by communication device 200 (FIG. 2), has access to one or more microphone(s) 107 that sense audio direction. Electronic device 100 also has access to multiple image capturing devices 102, one of which is automatically selected to provide optimized image content of person 118 to a video communication session. Electronic device 100 automatically selects which image capturing device to place in service based, at least in part, on audio direction sensing. In the provided example, controller 101 (FIG. 1) can analyze audio and video characteristics of persons 118 and second person 518 to determine who is the local participant in the video communication session. One of these characteristics analyzed by controller 101 is who is speaking and the direction from which the speech audio originates. Controller 101 (FIG. 1) also includes information about audio output 509 at first direction 510*a* that is being presented at audio output device(s) 166, and controller uses that information to distinguish that device generated audio output 509 from speech audio input 511 originating from person 118 at second direction 510*b*. Once person 118 who is the local participant is identified acoustically, the best or optimum view may be selected using the audio input as a primary criterion, as previously described for FIG. 4.

Figure 6A:
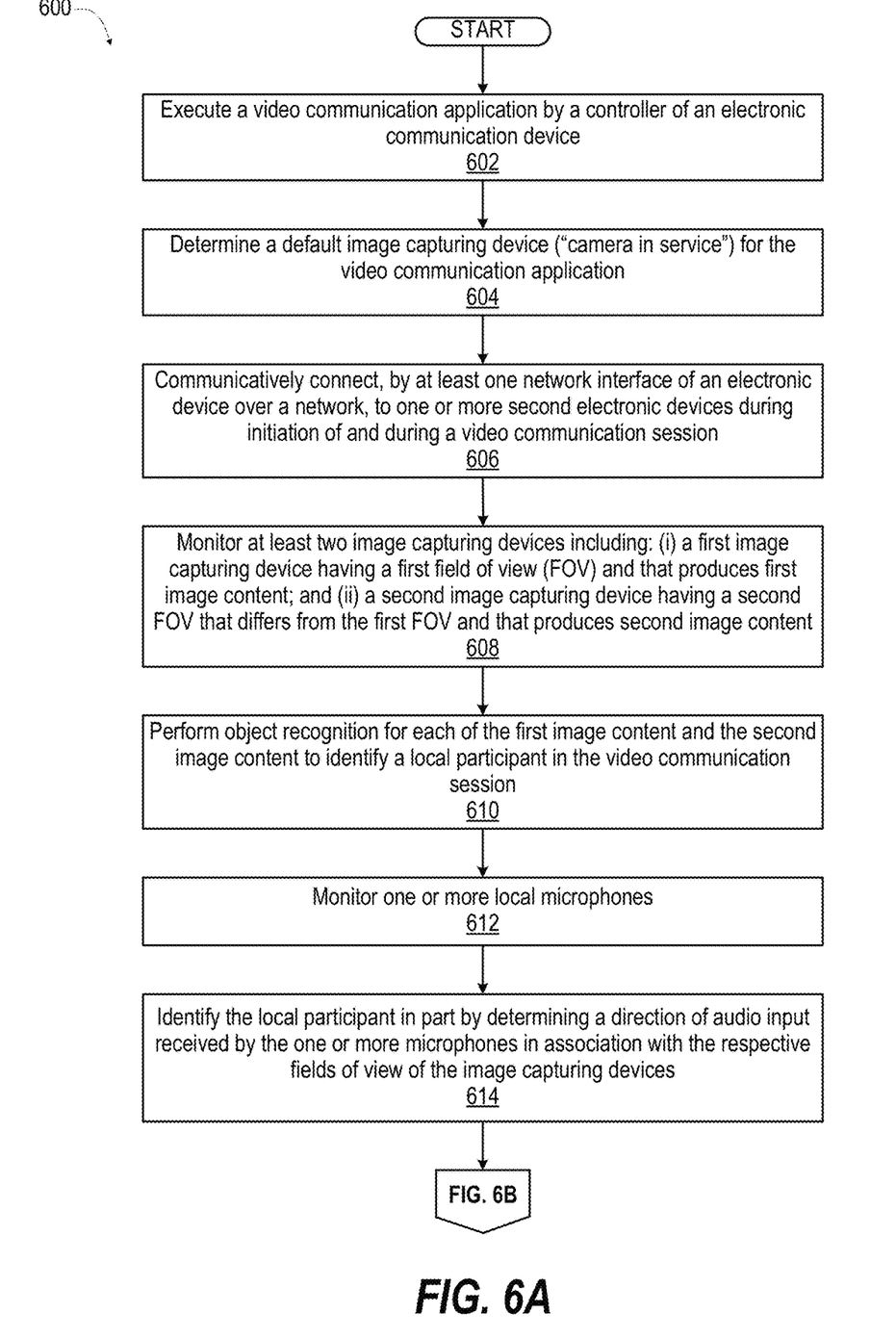
FIGS. 6A-6B (collectively "FIG. 6") present a flow diagram of a method by which an electronic/communication device automatically selects an image capturing device from among multiple available image capturing devices during a video communication session, according to one or more embodiments.
Figure 6B:
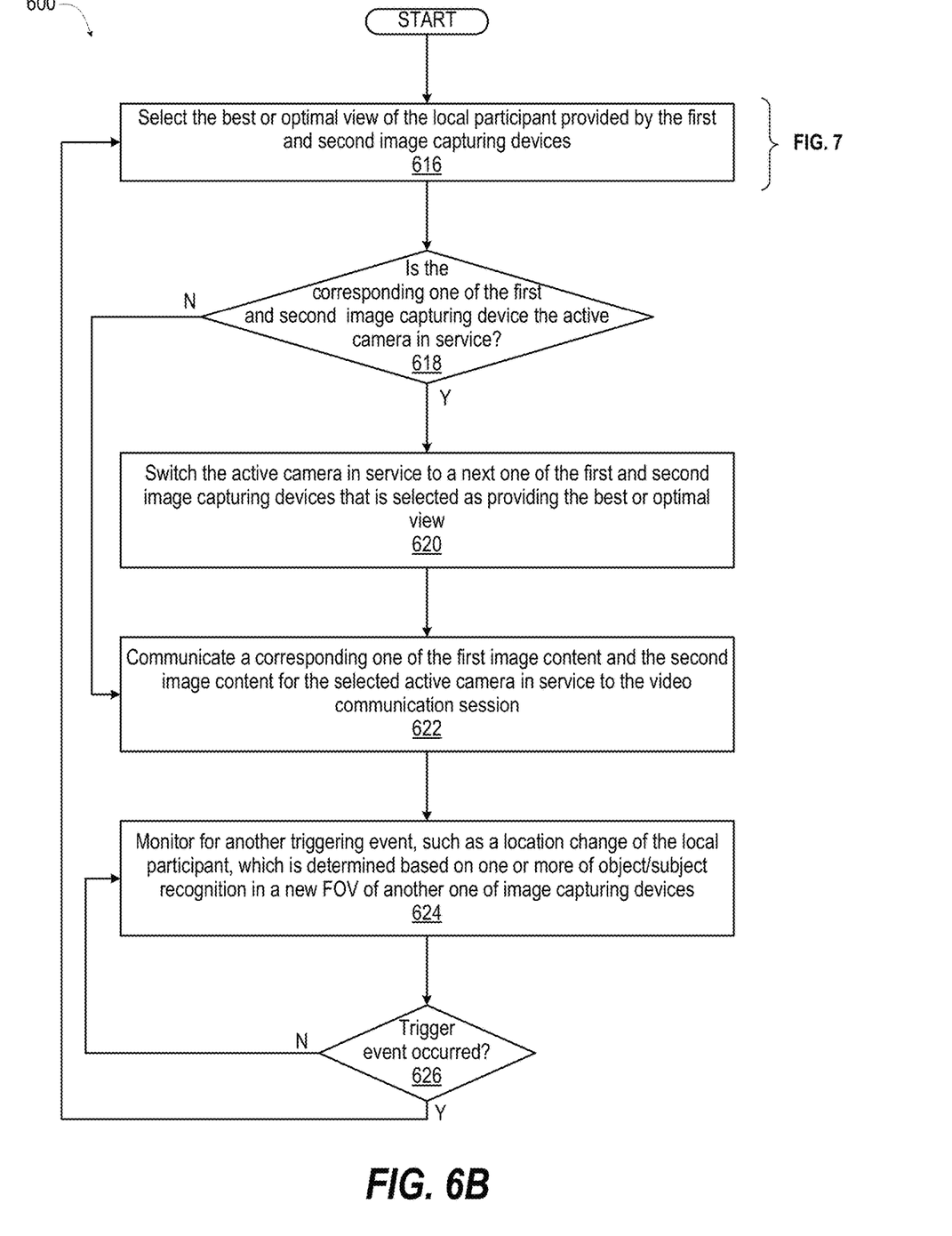
Figure 7:
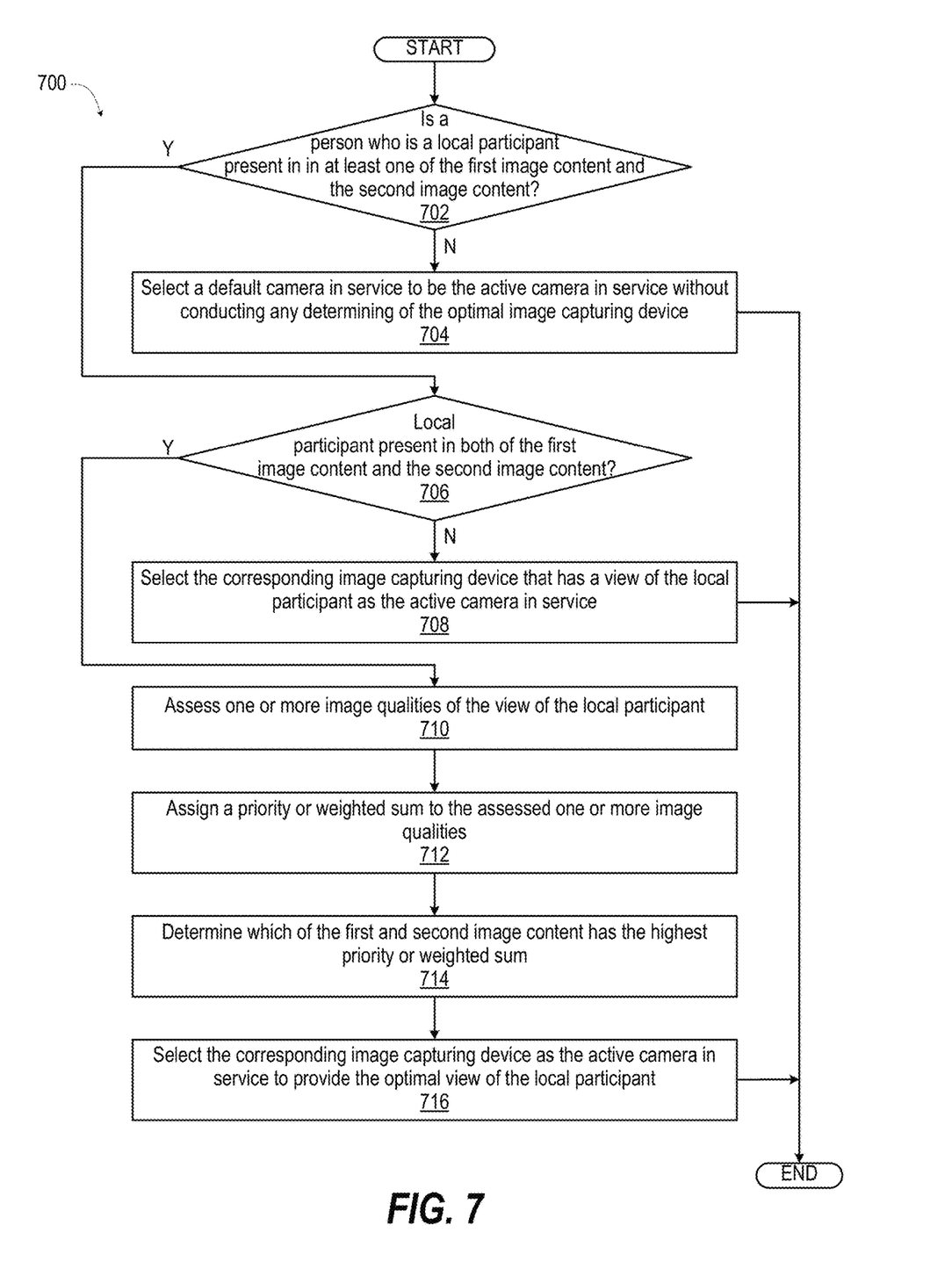
FIG. 7 presents a flow diagram of a method for automatically selecting an image capturing device having an optimal view for capturing an image from among more than one image capturing devices, according to one or more embodiments.

FIGS. 6A-6B (collectively "FIG. 6") present a flow diagram of method 600 performed by electronic device 100 (FIG. 1) or communication device 200 (FIG. 2) for automatically selecting an image capturing device from among multiple available image capturing devices to provide image content during a video communication session. FIG. 7 presents a flow diagram of method 700 for automatically selecting the best or optimal view of a subject captured within an image/video among more than one image capturing device. The descriptions of methods 600 (FIGS. 6A-6B) and 700 (FIG. 7) are provided with general reference to the specific components illustrated within the preceding FIGS. 1, 2, 3A-3B, 4, and 5 and specific components referenced in methods 600 and 700 may be identical or similar to components of the same name used in describing preceding FIGS. 1, 2, 3A-3B, 4, and 5. In one or more embodiments, controller 101 executes ACS component 108 and configures electronic device 100 (FIG. 1) or communication device (FIG. 2) to provide functionality of methods 600 (FIGS. 6A-6B) and 700 (FIG. 7).

With reference to FIG. 6A, method 600 includes executing a video communication application by a controller of an electronic device (block 602). Method 600 includes communicatively connecting, by at least one network interface of an electronic device over a network, to one or more second electronic devices during initiation of and during a video communication session (block 604). Initial setup of the video communication session is an example of a triggering event that prompts automatic selection of "camera in service" to offer local image content to the video communication session. Method 600 includes monitoring at least two image capturing devices including: (i) a first image capturing device having a first field of view (FOV) and that produces first image content; and (ii) a second image capturing device having a second FOV that differs from the first FOV and that produces second image content (block 606). In an example, first image capturing device is a front camera and the second image capturing device is a back camera of the electronic device. In another example, first and second image capturing devices both face the local participant but differ in one or more of magnification, field of view, light sensitivity, focus, etc. In an additional example, first and second image capturing devices are incorporated on different devices and have a different orientation relative to the local participant. Method 600 includes performing object recognition for each of the first image content and the second image content to identify a local participant in the video communication session (block 608). In one or more embodiments, method 600 includes monitoring one or more local microphones (block 610). Method 600 includes identifying the local participant in part by determining a direction of audio input received by the one or more microphones in association with the respective fields of view of the image capturing devices (block 612). Method 600 proceeds to FIG. 6B.

With reference to FIG. 6B, method 600 includes selecting the best or optimal view of the local participant provided by the first and second image capturing devices (block 614). An example of selecting the best or optimal view is provided by method 700 as depicted in FIG. 7, which is described below. With continued reference to FIG. 6B, method 600 includes switching the active camera in service to a next one of the first and second image capturing devices that is selected as providing the best or optimal view of the subject (block 616). Method 600 includes communicating a corresponding one of the first image content and the second image content for the selected active camera in service to the video communication session (block 618). Method 600 includes monitoring for another triggering event, such as a location change of the local participant, which is determined based on one or more of object/subject recognition in a new FOV of another one of image capturing devices 102 and source direction of received audio input (block 620). Method 600 includes determining whether a triggering event has occurred (decision block 622). In response to determining that a triggering event has not occurred, method 600 returns to block 620. In response to determining that a triggering event has occurred, method 600 returns to block 614.

With reference to FIG. 7, method 700 includes determining whether local participant 118 is present at least one of the first image content and the second image content (decision block 702). In response to determining that the local participant is not present in at least one of the first image content and the second image content, method 700 includes selecting a default camera to be the camera in service, without conducting any determination of or optimal image capturing device (block 704). Then method 700 ends. In response to determining that the local participant is present in at least one of the first and second image content, method 700 includes determining whether the local participant is present in both the first image content and the second image content (decision block 706). In response to determining that the local participant is not present in both of (i.e., is present in only one of) the first image content and the second image content, method 700 includes selecting the corresponding image capturing device that has a view of the local participant as the camera in service (block 708). Then method 700 ends. In response to determining that the local participant is present in both the first image content and the second image content (i.e., the local participant is present in both), method 700 includes assessing one or more image qualities of the view of the local participant for the first and second image content (block 710). The one or more image qualities include, but are not necessarily limited to: (i) image focus of the local participant; (ii) presence and orientation of the face of the local participant; (iii) relative scale of the head and upper torso to the respective view. Method 700 includes assigning a priority or weighted sum to the assessed one or more image qualities (block 712). Method 700 includes determining which of the first or second image content has the highest priority or weighted sum (block 714). Method 700 includes selecting the corresponding image capturing device as the device in service to provide the optimal view of the subject (block 716). Then method 700 ends.

In one or more embodiments, a method includes communicatively connecting, by at least one network interface of an electronic device over a network, to one or more second electronic devices during a video communication session. The method includes monitoring at least two image capturing devices including: (i) a first image capturing device having a first field of view (FOV) and that produces first image content; and (ii) a second image capturing device having a second FOV that differs from the first FOV and that produces second image content. In response to a trigger event to start providing image content to a video communication session, the method includes determining which one of the first FOV and the second FOV encompasses a local participant in the video communication session; and communicating a corresponding one of the first image content and the second image content to the video communication session.

In one or more particular embodiments, the method includes executing a video communication application that receives and presents content from the video communication session at one or more local output devices. The method includes designating a corresponding one of first image capturing device and the second image capturing device as an active camera in service to capture the image content transmitted to the video communication application. The method includes switching the active camera in service to a next one of the first and second image capturing devices in response to determining that a corresponding FOV of the next one of the first and second image capturing devices encompasses the local participant.

In one or more particular embodiments, the method includes determining which one of the first FOV and the second FOV encompasses a local participant in the video communication session by: (i) monitoring at least one local microphone, wherein the first image capturing device is a front camera and the second image capturing device is a back camera of the electronic device; (ii) receiving audio input detected by the at least one local microphone; and (iii) determining which one of the first FOV and the second FOV encompasses the local participant in the video communication session, based on a direction of a source of the audio input relative to a location of the first camera and the second camera. In one or more specific embodiments, the method further includes presenting audio content at one or more local output devices; and differentiating the audio input from the outputted audio content to determine a direction of the source of the audio input that is different from the one or more local output devices.

In one or more particular embodiments, the method includes performing object recognition for each of the first image content and the second image content; and determining one of the first FOV and the second FOV that encompasses the local participant in the video communication session in response to recognizing a presence of at least a head of a person in the corresponding one of the first image content and the second image content.

In one or more particular embodiments, the method includes performing object recognition for each of the first image content and the second image content. In response to recognizing a presence of at least a head of a person in both of the first image content and the second image content, the method includes determining which one of the first FOV and the second FOV encompasses a larger upper body image of the local participant.

In one or more particular embodiments, the method includes performing object recognition for each of the first image content and the second image content. In response to recognizing a presence of at least a head of a person in both of the first image content and the second image content, the method includes determining which one of the first FOV and the second FOV has a better image quality of the local participant. The method includes designating a corresponding one of first image capturing device and the second image capturing device as an active camera in service to capture the image content transmitted to a video communication application. The method includes switching the active camera in service to a next one of the first and second image capturing devices in response to determining that a corresponding FOV of the next one of the first and second image capturing devices encompasses the local participant.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
at least two image capturing devices including: (i) a first image capturing device having a first field of view (FOV) and that produces first image content; and (ii) a second image capturing device having a second FOV that differs from the first FOV and that produces second image content;
at least one network interface that communicatively connects the electronic device over a network to one or more second electronic devices during a video communication session; and
a controller communicatively coupled to the first image capturing device, the second image capturing device, and the at least one network interface, and which:
in response to detecting a trigger event to start providing image content to a video communication session:
automatically selects an image capturing device from among the at least two image capturing devices to utilized for the video communication session, wherein the controller determines which one of the first FOV and the second FOV best encompasses a local participant in the video communication session;
communicates a corresponding one of the first image content and the second image content to the video communication session;
monitors for another triggering event comprising a location change of the local participant; and
in response to the local participant moving out of the FOV of a currently selected active camera, automatically selects, as the active camera, another one of the at least two image capturing devices that has a field of view of the local participant.

2. The electronic device of claim 1, further comprising:
a memory that stores a video communication application, the memory communicatively coupled to the controller; and
the controller:
executes the video communication application to receive and present content from the video communication session at one or more local output devices;
designates a corresponding one of first image capturing device and the second image capturing device as an active camera in service to capture the image content transmitted to the video communication application; and
switches the active camera in service to a next one of the first and second image capturing devices in response to determining that a corresponding FOV of the next one of the first and second image capturing devices encompasses the local participant or provides a best view of the local participant.

3. The electronic device of claim 1, further comprising:
at least one local microphone communicatively coupled to the controller; and
wherein the first image capturing device is a front camera and the second image capturing device is a back camera of the electronic device; and
wherein, to determine which one of the first FOV and the second FOV encompasses a local participant in the video communication session, the controller:
receives audio input detected by the at least one local microphone; and
determines which one of the first FOV and the second FOV encompasses the local participant in the video communication session, based on a direction of a source of audio input originating from the local participant, relative to a location of the first camera and the second camera.

4. The electronic device of claim 3, wherein the controller:
presents device generated audio at one or more local output devices; and
differentiates the audio input originating from the local participant from the device generated audio being outputted at the one or more local output devices to determine a direction of the source of the audio input that is different from the one or more local output devices.

5. The electronic device of claim 1, wherein the controller:
performs object recognition for each of the first image content and the second image content; and
determines one of the first FOV and the second FOV that encompasses the local participant in the video communication session in response to recognizing a presence of at least a head of a person in the corresponding one of the first image content and the second image content.

6. The electronic device of claim 1, wherein the controller:
performs object recognition for each of the first image content and the second image content;
in response to recognizing a presence of at least a head of a same person in both of the first image content and the second image content, determines which one of the first FOV and the second FOV encompasses a larger upper body image of the local participant.

7. The electronic device of claim 1, wherein the controller:
performs object recognition for each of the first image content and the second image content; and
in response to recognizing a presence of at least a head of a person in both of the first image content and the second image content:
determines which one of the first FOV and the second FOV has a better image quality of the local participant;
designates a corresponding one of first image capturing device and the second image capturing device as an active camera in service to capture the image content transmitted to a video communication application; and
switches the active camera in service to a next one of the first and second image capturing devices in response to determining that a corresponding FOV of the next one of the first and second image capturing devices provides a best or optimal view of the local participant.

8. A method comprising:
communicatively connecting, by at least one network interface of an electronic device over a network, to one or more second electronic devices during a video communication session;
monitoring at least two image capturing devices including: (i) a first image capturing device having a first field of view (FOV) and that produces first image content; and (ii) a second image capturing device having a second FOV that differs from the first FOV and that produces second image content;
in response to a trigger event to start providing image content to a video communication session:
automatically selecting an image capturing device from among the at least two image capturing devices to utilized for the video communication session by determining which one of the first FOV and the second FOV encompasses a local participant in the video communication session; and
communicating a corresponding one of the first image content and the second image content to the video communication session;
monitoring for another triggering event comprising a location change of the local participant; and in response to the local participant moving out of the FOV of a currently selected active camera, automatically selects, as the active camera, another one of the at least two image capturing devices that has a field of view of the local participant.

9. The method of claim 8, further comprising:
executing a video communication application that receives and presents content from the video communication session at one or more local output devices;
designating a corresponding one of first image capturing device and the second image capturing device as an active camera in service to capture the image content transmitted to the video communication application; and
switching the active camera in service to a next one of the first and second image capturing devices in response to determining that a corresponding FOV of the next one of the first and second image capturing devices encompasses the local participant or provides a best view of the local participant.

10. The method of claim 8, wherein determining which one of the first FOV and the second FOV encompasses a local participant in the video communication session comprises:
monitoring at least one local microphone, wherein the first image capturing device is a front camera and the second image capturing device is a back camera of the electronic device;
receiving audio input detected by the at least one local microphone; and
determining which one of the first FOV and the second FOV encompasses the local participant in the video communication session, based on a direction of a source of audio input originating from the local participant, relative to a location of the first camera and the second camera.

11. The method of claim 10, further comprising:
presenting device generated audio at one or more local output devices; and
differentiating the audio input originating from the local participant from the device generated audio being outputted at the one or more local output devices to determine a direction of the source of the audio input that is different from the one or more local output devices.

12. The method of claim 8, further comprising:
performing object recognition for each of the first image content and the second image content; and
determining one of the first FOV and the second FOV that encompasses the local participant in the video communication session in response to recognizing a presence of at least a head of a person in the corresponding one of the first image content and the second image content.

13. The method of claim 8, further comprising:
performing object recognition for each of the first image content and the second image content;
in response to recognizing a presence of at least a head of a same person in both of the first image content and the second image content, determining which one of the first FOV and the second FOV encompasses a larger upper body image of the local participant.

14. The method of claim 8, further comprising:
performing object recognition for each of the first image content and the second image content; and
in response to recognizing a presence of at least a head of a person in both of the first image content and the second image content:

determining which one of the first FOV and the second FOV has a better image quality of the local participant;

designating a corresponding one of first image capturing device and the second image capturing device as an active camera in service to capture the image content transmitted to a video communication application; and switching the active camera in service to a next one of the first and second image capturing devices in response to determining that a corresponding FOV of the next one of the first and second image capturing devices provides a best or optimal view of the local participant.

15. A computer program product comprising:

a computer readable storage device; and program code on the computer readable storage device that when executed by a processor associated with an electronic device, the program code enables the electronic device to provide functionality of:

communicatively connecting, by at least one network interface of an electronic device over a network, to one or more second electronic devices during a video communication session;

monitoring at least two image capturing devices including: (i) a first image capturing device having a first field of view (FOV) and that produces first image content; and (ii) a second image capturing device having a second FOV that differs from the first FOV and that produces second image content;

in response to a trigger event to start providing image content to a video communication session:

automatically selecting an image capturing device from among the at least two image capturing devices to utilized for the video communication session by determining which one of the first FOV and the second FOV encompasses a local participant in the video communication session; and communicating a corresponding one of the first image content and the second image content to the video communication session;

monitoring for another triggering event comprising a location change of the local participant; and in response to the local participant moving out of the FOV of a currently selected active camera, automatically selects, as the active camera, another one of the at least two image capturing devices that has a field of view of the local participant.

16. The computer program product of claim 15, wherein the program code enables the electronic device to provide functionality of:

executing a video communication application that receives and presents content from the video communication session at one or more local output devices;

designating a corresponding one of first image capturing device and the second image capturing device as an active camera in service to capture the image content transmitted to the video communication application; and switching the active camera in service to a next one of the first and second image capturing devices in response to determining that a corresponding FOV of the next one of the first and second image capturing devices encompasses the local participant or provides a best view of the local participant.

17. The computer program product of claim 15, wherein the program code enables the electronic device to provide functionality of determining which one of the first FOV and the second FOV encompasses a local participant in the video communication session by:

monitoring at least one local microphone, wherein the first image capturing device is a front camera and the second image capturing device is a back camera of the electronic device;

presenting audio content at one or more local output devices;

receiving audio input detected by the at least one local microphone; and differentiating the audio input from the outputted audio content; and determining which one of the first FOV and the second FOV encompasses the local participant in the video communication session, based on a direction of a source of audio input originating from the local participant, relative to a location of the first camera and the second camera.

18. The computer program product of claim 15, wherein the program code enables the electronic device to provide functionality of:

performing object recognition for each of the first image content and the second image content; and determining one of the first FOV and the second FOV that encompasses the local participant in the video communication session in response to recognizing a presence of at least a head of a person in the corresponding one of the first image content and the second image content.

19. The computer program product of claim 15, wherein the program code enables the electronic device to provide functionality of:

performing object recognition for each of the first image content and the second image content;

in response to recognizing a presence of at least a head of a same person in both of the first image content and the second image content, determining which one of the first FOV and the second FOV encompasses a larger upper body image of the local participant.

20. The computer program product of claim 15, wherein the program code enables the electronic device to provide functionality of:

performing object recognition for each of the first image content and the second image content; and in response to recognizing a presence of at least a head of a person in both of the first image content and the second image content:

determining which one of the first FOV and the second FOV has a better image quality of the local participant;

designating a corresponding one of first image capturing device and the second image capturing device as an active camera in service to capture the image content transmitted to a video communication application; and switching the active camera in service to a next one of the first and second image capturing devices in response to determining that a corresponding FOV of the next one of the first and second image capturing devices provides a best or optimal view of the local participant.

* * * * *